US007962168B2

(12) United States Patent
Ajiro

(10) Patent No.: US 7,962,168 B2
(45) Date of Patent: Jun. 14, 2011

(54) WIRELESS COMMUNICATION TERMINAL, METHOD OF DISPLAYING APPLICATION AND COMPUTER PROGRAM PRODUCT

(75) Inventor: Atsushi Ajiro, Kanagawa (JP)

(73) Assignee: Sony Ericsson Mobile Communications AB, Lund (SE)

( * ) Notice: Subject to any disclaimer, the term of this patent is extended or adjusted under 35 U.S.C. 154(b) by 914 days.

(21) Appl. No.: 11/740,488

(22) Filed: Apr. 26, 2007

(65) Prior Publication Data

US 2007/0259695 A1 Nov. 8, 2007

(30) Foreign Application Priority Data

May 8, 2006 (JP) ................................ 2006-129359

(51) Int. Cl.
*H04M 1/00* (2006.01)
(52) U.S. Cl. ..................... 455/550.1; 455/566; 455/466; 455/414.4; 345/168; 345/169
(58) Field of Classification Search .................. 455/566, 455/466, 414.4; 345/168, 169
See application file for complete search history.

(56) References Cited

U.S. PATENT DOCUMENTS

| | | | | |
|---|---|---|---|---|
| 5,737,394 A * | 4/1998 | Anderson et al. | ........... | 379/88.11 |
| 6,052,070 A * | 4/2000 | Kivela et al. | ..................... | 341/22 |
| 6,223,059 B1 * | 4/2001 | Haestrup | ........................ | 455/566 |
| 6,259,934 B1 * | 7/2001 | Guerlin | .......................... | 455/566 |
| 6,411,822 B1 * | 6/2002 | Kraft | .............................. | 455/558 |
| 6,810,272 B2 * | 10/2004 | Kraft et al. | ..................... | 455/566 |
| 6,931,264 B2 * | 8/2005 | Walston et al. | ................ | 455/566 |
| 7,002,553 B2 * | 2/2006 | Shkolnikov | .................... | 345/169 |
| 7,092,703 B1 * | 8/2006 | Papineau | ........................ | 455/418 |
| 7,120,473 B1 * | 10/2006 | Hawkins et al. | ............ | 455/575.1 |
| 7,184,024 B2 * | 2/2007 | Eftekhari | ....................... | 345/169 |
| 7,218,249 B2 * | 5/2007 | Chadha | ........................... | 341/23 |
| 7,321,779 B2 * | 1/2008 | Kang | ............................. | 455/466 |
| 7,439,959 B2 * | 10/2008 | Griffin et al. | .................. | 345/169 |
| 7,570,251 B2 * | 8/2009 | Ji | .................................... | 345/169 |
| 7,603,142 B1 * | 10/2009 | Toebes et al. | ................. | 455/566 |
| 7,629,964 B2 * | 12/2009 | Griffin et al. | .................. | 345/169 |
| 7,669,144 B2 * | 2/2010 | Lee et al. | ....................... | 715/847 |
| 7,708,416 B2 * | 5/2010 | Yurochko | ........................ | 362/29 |
| 7,721,968 B2 * | 5/2010 | Wigdor | ...................... | 235/472.01 |
| 7,819,598 B2 * | 10/2010 | Griffin | ........................... | 400/486 |

(Continued)

FOREIGN PATENT DOCUMENTS

JP 2002-024340 1/2002

(Continued)

*Primary Examiner* — Kwasi Karikari
(74) *Attorney, Agent, or Firm* — Oblon, Spivak, McClelland, Maier & Neustadt, L.L.P.

(57) ABSTRACT

A wireless communication terminal that performs wireless communication with a predetermined base station includes: a storage unit, an operation unit, a control unit and a display unit. The storage unit is configured to store information indicating correspondence between applications handling a numeric string including at least one numeral as an input value, and formats and units of the numeric string. The operation unit is configured to input the numeral. The control unit is configured to determine whether the numeral input with the operation unit corresponds to any of the formats of the numeric string stored in the storage unit, and to retrieve the corresponding application, based on the above-described information stored in the storage unit, in the case where it is determined that the input numeral corresponds to the format. The display unit is configured to display the application retrieved by the control unit.

6 Claims, 10 Drawing Sheets

U.S. PATENT DOCUMENTS

| | | | |
|---|---|---|---|
| 7,881,743 B2* | 2/2011 | Griffin et al. | 455/550.1 |
| 2002/0065069 A1* | 5/2002 | Phillips | 455/419 |
| 2002/0146989 A1* | 10/2002 | Moriki | 455/90 |
| 2003/0064686 A1* | 4/2003 | Thomason et al. | 455/90 |
| 2003/0064757 A1* | 4/2003 | Yamadera et al. | 455/566 |
| 2004/0018858 A1* | 1/2004 | Nelson | 455/566 |
| 2005/0020316 A1* | 1/2005 | Mahini | 455/566 |

FOREIGN PATENT DOCUMENTS

| | | |
|---|---|---|
| JP | 2003-298715 | 10/2003 |
| JP | 2005-236526 | 9/2005 |

* cited by examiner

FIG. 3

| Input Pattern | Input Example | Determination Pattern | | | | | | | | | |
|---|---|---|---|---|---|---|---|---|---|---|---|
| | | 1 | 2 | 3 | 4 | 5 | 6 | 7 | 8 | 9 | 10 |
| | | Time Period | | | | Clock Time | | Date | | Integer | Decimal Number |
| | | Hour | Minute | Second | Hour/Minute (/Second) | Hour | Hour/Minute (/Second) | Month | Month/Day | | |
| 1 AB(C)DE(F)GH | 12*34*56 | | | | 12hrs. 34min. 56sec. | | 12:34:56 | | | | |
| 2 ABCDEF | 123456 | | | | 12hrs. 34min. 56sec. | | 12:34:56 | | | | |
| 3 AB(C)DE ※1 | 12*34 | | | | 12hrs. 34min. | | 12:34 | | | 1234 | |
| 4 AB(C)DE ※2 | 12*12 | | | | 12hrs. 12min. | | 12:12 | | 12/12 | 1212 | |
| 5 ABCD | 5678 | | | | | | | | | 5678 | |
| 6 ABCD ※1 | 1234 | | | 1234sec. | 12hrs. 34min. | | 12:34 | | | 1234 | |
| 7 ABCD ※2 | 1212 | | | 1212sec. | 12hrs. 12min. | | 12:12 | | 12/12 | 1212 | |
| 8 ABC | 123 | 123hrs. | 123min. | 123sec. | | | | | 12/ 3 | 123 | |
| 9 AB | 12 | 12hrs. | 12min. | 12sec. | | 12 | | 12 | | 12 | |
| 10 A | 1 | 1hr | 1min. | 1sec. | | 1 | | 1 | | 1 | |
| 11 A(B)CD | 1*23 | | | | 1hrs. 23min. | | 1:23 | | 1/23 | | 1.23 |
| 12 AB(C)D | 12*3 | | | | 12hrs. 3min. | | 12:03 | | 12/ 3 | | 12.3 |
| 13 Number of 7 Digits or More (Numbers Only) | 1234567 | | | | | | | | | 1234567 | |

| | Clock Setting | Alarm | Timer | Timetable | Calendar | Household Accounts | Internet Easy Access | Calculator |
|---|---|---|---|---|---|---|---|---|
| Determination Pattern 1 | | ○ | ○ | | | | | |
| Determination Pattern 2 | | ○ | ○ | | | | | |
| Determination Pattern 3 | | ○ | ○ | | | | | |
| Determination Pattern 4 | | ○ | ○ | | | | | |
| Determination Pattern 5 | ○ | ○ | | ○ | | | | |
| Determination Pattern 6 | ○ | ○ | | ○ | | | | |
| Determination Pattern 7 | | | | ○ | ○ | | | |
| Determination Pattern 8 | | | | ○ | ○ | ○ | | |
| Determination Pattern 9 | | | | | | ○ | ○ | ○ |
| Determination Pattern 10 | | | | | | | ○ | ○ |

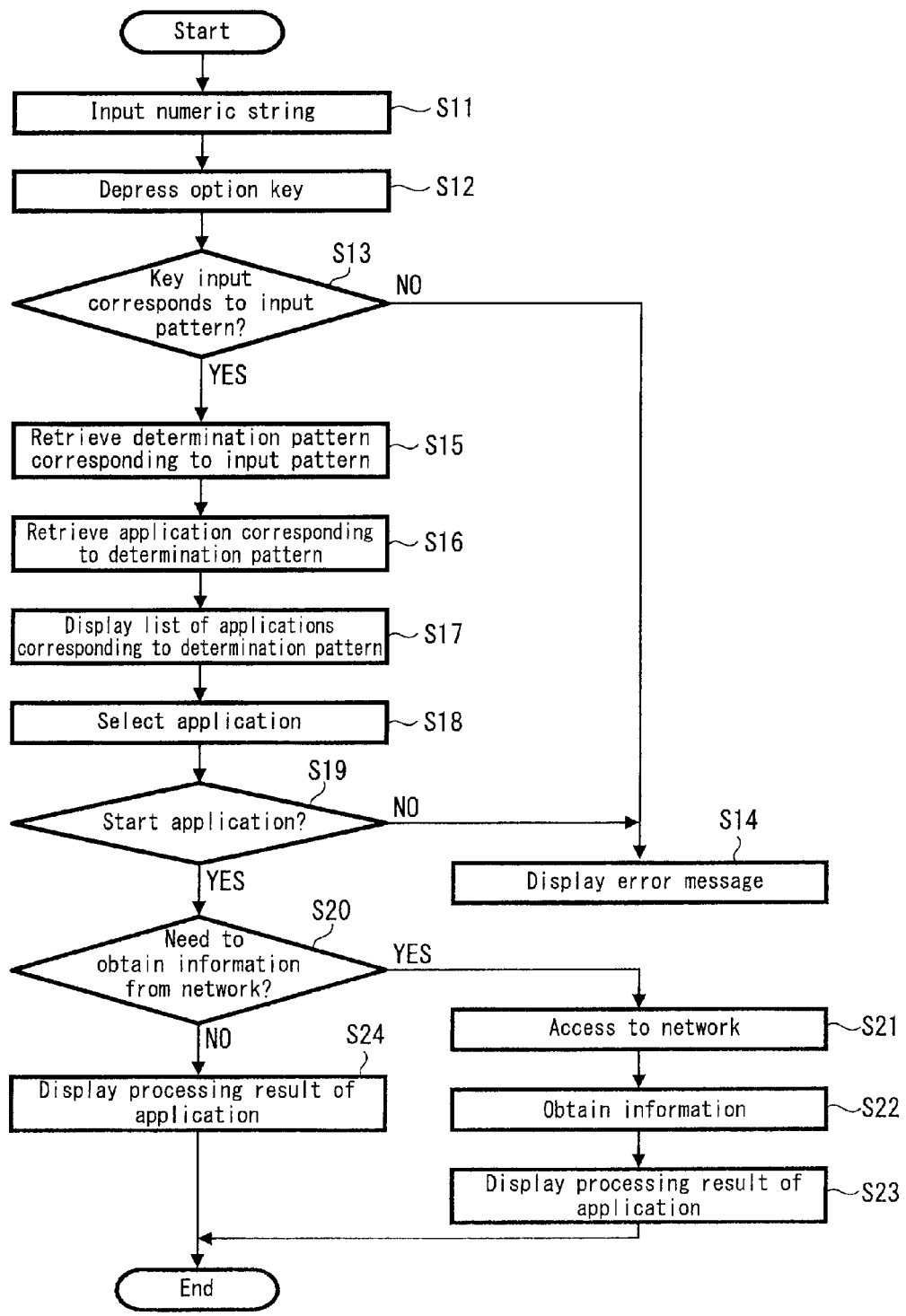

WIRELESS COMMUNICATION TERMINAL, METHOD OF DISPLAYING APPLICATION AND COMPUTER PROGRAM PRODUCT

CROSS REFERENCES TO RELATED APPLICATIONS

The present invention contains subject matter related to Japanese Patent Application JP 2006-129359 filed in the Japanese Patent Office on May 8, 2006, the entire contents of which being incorporated herein by reference.

BACKGROUND OF THE INVENTION

1. Field of the Invention

The present invention relates to a wireless communication terminal suitable for being applied to, for example, a mobile phone unit, a method of displaying an application on the wireless communication terminal, and a computer program product to execute processing steps thereof.

2. Description of the Related Art

Lately, various applications have been installed in a mobile phone unit, and respective functions of the applications are typically classified according to categories and purposes thereof and hierarchically organized under a main menu. However, a large variety of applications have been used and the menu has become complicated, and it has been difficult for a user to search an application that the user wants to use without complicated operations.

Therefore, there have been a method of collectively registering frequently-used applications and function setting menus at a specific location such as "bookmark" for an Internet browser, and a method of displaying shortcuts to such applications and menus on a display screen for the convenience of the user.

Japanese Unexamined Patent Application Publication No. 2003-298715 discloses a method of displaying shortcuts to menus frequently used by a user, content thereof and the like on the display screen.

SUMMARY OF THE INVENTION

Applications such as an alarm, a calculator, and household accounts in common handle numbers as input values; however, in the case where each application is actually used, it is necessary to start the application by selecting hierarchically prepared menus one after another starting from the main menu screen. In this regard, it is difficult to know in advance the location of a desired application in the menus, and therefore it is necessary to refer to an instruction manual until the user gets accustomed to the operation, which is inconvenient for the user.

It is desirable to improve operability when selecting and starting an application in a wireless communication terminal.

According to an embodiment of the present invention, an application that handles a numeric string as an input value is started without difficulty based on the input of the numeric string that is directly processed as the input value for the application.

Accordingly, various kinds of applications having different functions can be started by inputting such numeric strings as long as the application handles a numeric string as an input value.

According to the embodiment of the present invention, the desired application can be started by inputting the numeric string which the user wants to actually set as the input value for the application, and therefore it may be unnecessary for the user to know the structure and hierarchy of the menus beforehand.

Here, the input numeric string is recognized and processed directly as the input value for each application, and therefore steps of a procedure from the selection of the application to the execution thereof can be shortened.

BRIEF DESCRIPTION OF THE DRAWINGS

FIG. 3 is a table showing an example of information indicating correspondence between input patterns and determination patterns according to an embodiment of the present invention;

FIG. 4 is a table showing an example of information indicating correspondence between the determination patterns and applications according to an embodiment of the present invention;

FIG. 5 is a flow chart showing an example of processing of displaying application according to an embodiment of the present invention;

DESCRIPTION OF THE PREFERRED EMBODIMENTS

An embodiment of the present invention is hereinafter described with reference to accompanied drawings.

A mobile phone unit is herein used as a wireless communication terminal according to the embodiment.

Figure 1:
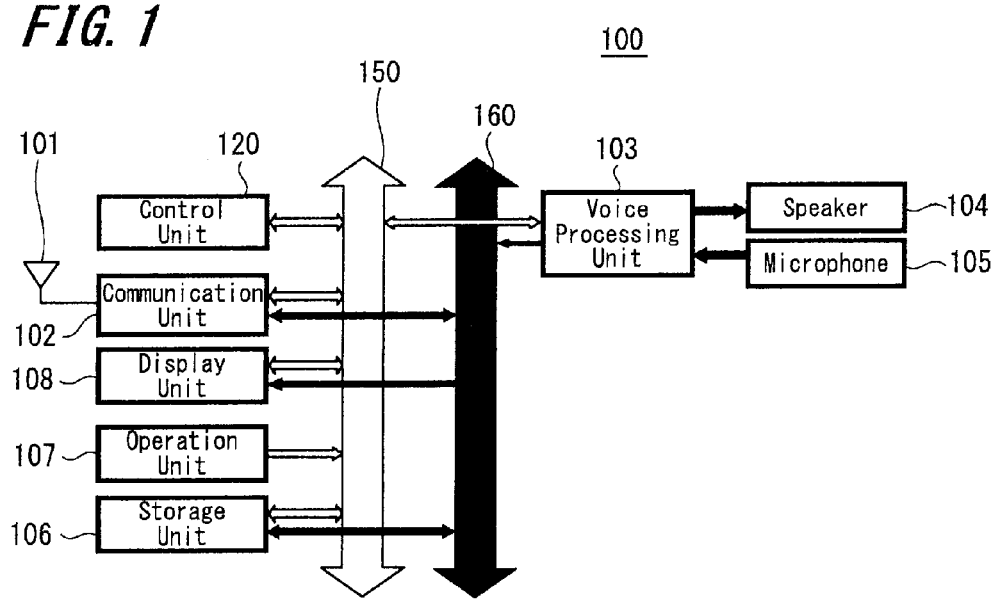
FIG. 1 is a block diagram showing an example of a configuration of a mobile phone unit according to an embodiment of the present invention.

FIG. 1 is a diagram showing an example of a configuration of the mobile phone unit used in the embodiment. A mobile phone unit 100 according to the embodiment includes a wireless telecommunication antenna 101 configured to perform wireless communication with a base station for wireless telephone communication. The antenna 101 is connected to a communication unit 102 for the wireless telecommunication, and a control unit 120 controls the wireless communication performed between the mobile phone unit 100 and the base station. When the communication unit 102 performs voice communication, received voice data is processed in a voice processing unit 103 and supplied to a speaker 104 to be output, and also voice picked up by a microphone 105 is processed in the voice processing unit 103 into voice data and supplied to the communication unit 102 to be transmitted.

Respective blocks in the mobile phone unit 100 are connected to the control unit 120 and other units through a control line 150, and data is transferred through a data line 160. Control information such as a control signal supplied from the control unit 120 is transferred using the control line 150, and voice data and character data are transferred using the data line 160. A storage unit 106 is a semiconductor memory such as ROM and RAM configured to store address data, mail data, and data handled in various applications. Further, information indicating correspondence between applications handling a numeric string as an input value and formats and units of the numeric string, which is described later, is also stored in the storage unit 106. Further, a hard disk drive unit that is a large capacity data storage may be provided as the storage unit 106 separately from the semiconductor memory so that data input into the mobile phone unit 100, data downloaded thereto, and the like are stored therein.

Figure 2:
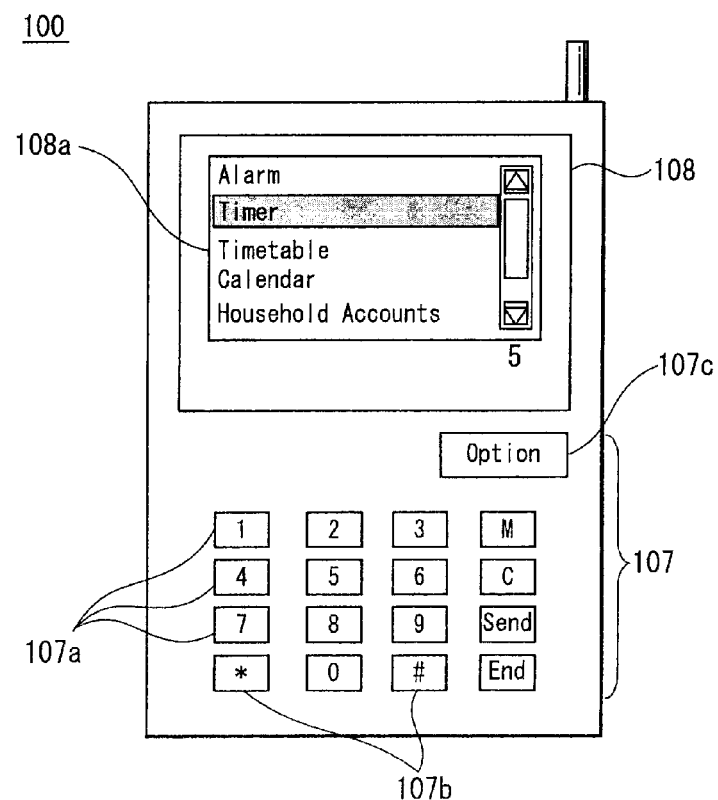
FIG. 2 is a schematic diagram showing an example of a configuration of a mobile phone unit according to an embodiment of the present invention.

FIG. 2 shows an example of an external shape of the mobile phone unit 100 according to this embodiment. The example shown in FIG. 2 has a typical external shape for the mobile phone unit 100, including an operation unit 107 provided with numeric keys 107a corresponding to numbers 1, 2, 3, - - - , 0, symbol keys 107b, an option key 107c and the like, and a display unit 108 formed of a liquid crystal display panel or the like. Using the operation unit 107, a telephone number, a mail text and the like can be input, and various modes and the like can be set. In addition, when the option key 107c is depressed after a specific numeric string is input using the numeric keys 107a and symbol keys 107b, an application that handles the input numeric string as the input value can be started. In the example shown in FIG. 2, a list of later-described applications that handle a numeric value as the input value is displayed as a submenu 108a on the display unit 108. Mail text, a screen accessed to a web, a screen of various applications and the like can also be displayed on the display unit 108.

Referring to FIG. 2, an example of displaying the list of applications is hereinafter explained. FIG. 2 shows an example of the screen after an arbitrary numeric key ("5" in the case of FIG. 2) is depressed and subsequently the option key 107c is depressed in the operation unit 107. The list of the applications that handle the input numeral "5" as the input value, including "alarm", "timer", "timetable", "calendar", and "household accounts" is displayed as the submenu 108a. In the case where an arbitrary application ("timer" in FIG. 2) is selected using the operation unit 107 from the list of applications displayed in this state, the selected application ("timer") is started based on the control of the control unit 120. Detailed processing thereof is described later.

Next, an example of setting information that indicates correspondence between an application handling a numeric string as an input value and a format and unit of the numeric string is explained with reference to FIGS. 3 and 4. In FIG. 3, "input pattern" in the column direction represents a numeric string or a combination of numerals and symbols which is input using the numeric keys 107a on the operation unit 107, and defines a format handling the numeric string and combination as the input value for the application. There are thirteen kinds of "input patterns 1 through 13" depending on the numeric values, number of digits, and having or not having a separator dividing a numeric string. Numerals and symbols are schematically expressed using the alphabet in "input pattern", and a position where the symbol such as an asterisk is used is shown using parentheses such as "(C)", for example. A specific example of "input pattern" is shown in "input example" shown on the right next to "input pattern", where "12*34*56" is shown as the numeric string corresponding to the input pattern of "AB(C)DE(F)GH", for example.

In the table shown in FIG. 3, "determination pattern" in the row direction represents categories of the units of a numeric value, in the case where the application handles the input numeric string as the input value. In this example, five categories, which are "time period", "clock time", "date", "integer" and "decimal number", are set as the units of numeric values handled by the applications, and subcategories are provided for each of "time period", "clock time" and "date". For the section of "time period", subsections of "hour", "minute", "second" and "hour/minute(/second)" are provided. Also, "hour" and "hour/minute(/second)" are provided as subsections for the section of "clock time", and "month" and "month/day" are provided as subsections for the section of "date". "Determination patterns 1 to 10" show the units for the minimum subsections of respective items.

An input pattern is classified into any of the determination patterns without exception. In the case where the numeric string input with the operation unit 107 is "12*12" that corresponds to the format of "AB(C)DE" for "input pattern 4", "12*12" is classified into the determination pattern 4 (12 hrs. 12 min.), determination pattern 6 (12:12), determination pattern 8 (12/12), and determination pattern 9 ("1212"), for example. More specifically, FIG. 3 shows correspondence between the input value and the unit, in other words, the table shows units that may handle a numeric string as the input data, in the case where the numeric string is input using the operation unit 107 based on the format of "input pattern" and is processed as the input value of an application.

FIG. 4 shows categories of units that are employed in respective applications of "clock setting", "alarm", "timer", "timetable", "calendar", "household accounts", "Internet easy access" and "calculator" by indicating the correspondence with the determination patterns 1 to 10 such that the corresponding units are marked with "O". In the case where the application is "alarm", for example, the corresponding determination patterns are the determination pattern 1 ("hour" of "time period"), determination pattern 2 ("minute" of "time period"), determination pattern 3 ("second" of "time period"), determination pattern 4 ("hour/minute(/second)" of "time period"), determination pattern 5 ("hour" of "clock time") and determination pattern 6 ("hour/minute(/second)" of "clock time"), and therefore the units indicated in those determination patterns are shown as the units used for "alarm". Similarly, "calendar" is shown as the application that handles respective units indicated in the determination pattern 7 ("month" of "date") and determination pattern 8 ("month/day" of "date").

It should be noted that items shown in the tables in FIGS. 3 and 4 are not limited to the input patterns and determination patterns as described in this embodiment, but can be changed according to necessity.

Next, referring to a flow chart shown in FIG. 5 and the tables shown in FIGS. 3 and 4, an example of processing of starting a predetermined application by the input with the numeric keys according to the embodiment is explained. First, the processing is explained by referring to the flow chart shown in FIG. 5. After a numeric string is input using the numeric keys 107a on the operation unit 107 (step S11), the depression of the option key 107c is detected by the control unit 120 (step S12). Subsequently, it is determined based on the control of the control unit 120 whether the numeric string input at step S11 corresponds to any input pattern stored beforehand in the storage unit 106 or the like (step S13). It should be noted that the numeric string herein described also includes a one-digit number. In the case where it is determined at step S13 that the numeric string input with the operation unit 107 at step S11 does not correspond to any of the input patterns prepared beforehand, "No" is selected and an error message is displayed on the display unit 108 (step S14).

In the case where it is determined at step S13 that the numeric string input at step S11 with the operation unit 107 corresponds to any of the input patterns prepared beforehand, the determination pattern corresponding to the input pattern is retrieved (step S15). In the case where "1212" is the numeric string input with the operation unit 107, for example, the determination patterns 3, 4, 6, 8 and 9 are retrieved as the determination patterns corresponding to the input pattern 7, since "1212" matches "ABCD" for the input pattern 7 according to FIG. 3.

After the determination patterns corresponding to the input pattern are retrieved at step S15, the applications corresponding to the determination patterns are subsequently retrieved (step S16). Since the determination patterns herein described are the determination patterns 3, 4, 6, 8 and 9 which are retrieved at step S15 and the applications that handle those determination patterns as the units are "clock setting", "alarm", "timer", "timetable", "calendar" "household accounts" "Internet easy access" and "calculator" according to the table shown in FIG. 4, those applications are retrieved based on the control of the control unit 120.

A list of the retrieved applications is displayed on the display unit 108 (step S17) and an arbitrary application is selected by the user using the operation unit 107 (step S18), thereby the application being started based on the control of the control unit 120. In the case where the start of the application is not confirmed, the error message is displayed on the display unit 108 (step S14). On the other hand, in the case where the start of the application is confirmed, it is determined whether the selected application may require the access to the Internet network (step S20).

In the case where it is determined that the selected application may require the access to the network, connection to the network is made through the communication unit 102 (step S21) and necessary information can be obtained (step S22), and then a result of processing is displayed on the display unit 108 (step S23). On the other hand, in the case where it is determined that the selected application may not require the access to the network, the selected application is executed and the processing result is displayed on the display unit 108 (step S24).

FIGS. 6 through 8 are diagrams showing specific display examples for the respective kinds of application when the above-described processing is performed. FIGS. 6A to 6D are diagrams showing a display example for the start of "timer" from the input of numerals at the operation unit 107. For example, as shown in FIG. 6A, when depressing the option key 107c of the mobile phone unit 100 in a state of the numeral "5" input with the operation unit 107 being displayed on the display unit 108, the submenu 108a shown in FIG. 6B is displayed. The applications displayed on the submenu 108a are determined through the processing steps S13, S15, S16 and S17 as described in the flow chart shown in FIG. 5.

Figure 6A:
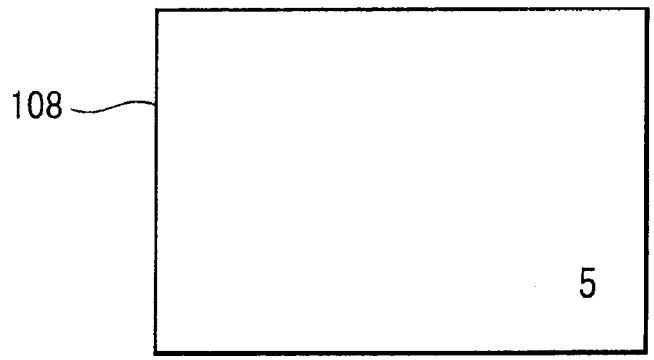
FIGS. 6A to 6D are explanatory diagrams showing display examples of a mobile phone unit according to an embodiment of the present invention.
Figure 6B:
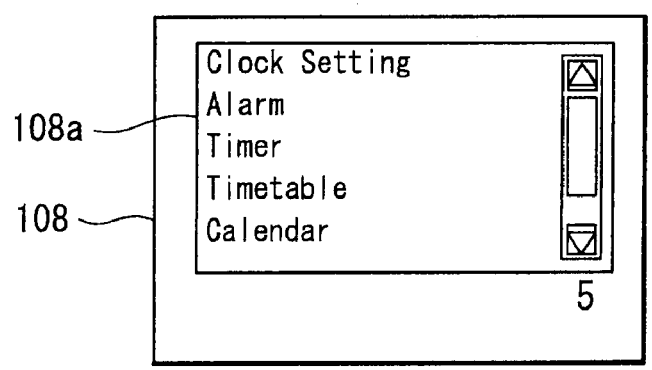
Figure 6C:
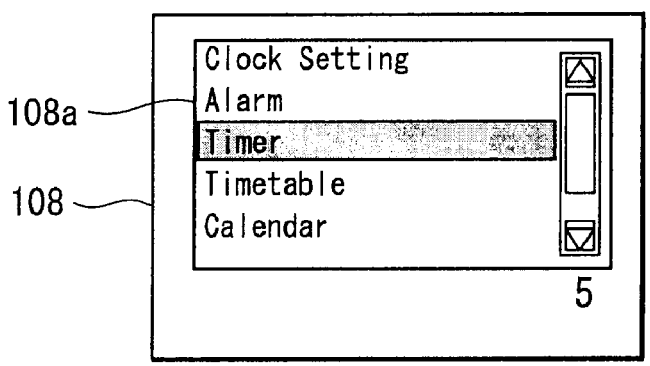
Figure 6D:
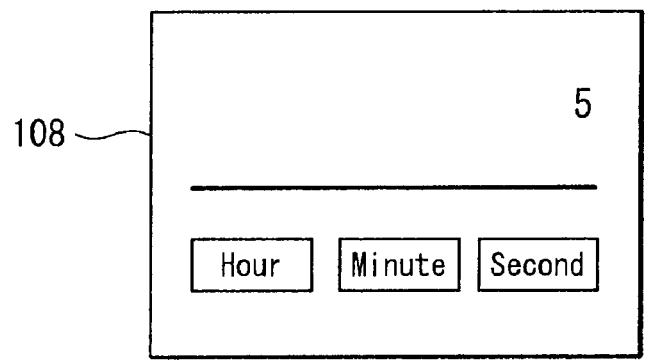

Here, the input value is "5" which is determined to correspond to "input pattern 10" in the table shown in FIG. 3 (step S13), and therefore determination patterns 1, 2, 3, 5, 7 and 9 are retrieved as those corresponding to the input pattern 10 (step S15). Further, as the applications corresponding to respective determination patterns, "clock setting", "alarm", "timer", "timetable", "calendar", "household accounts", "Internet easy access" and "calculator" are retrieved from the correspondence table shown in FIG. 4 (step S16). More specifically, a list of the applications that are "clock setting", "alarm", "timer", "timetable", "calendar", "household accounts", "Internet easy access" and "calculator" is displayed as the submenu in FIG. 6B, in the case where the input value is In the case where "timer" is selected from the list of applications displayed as shown in FIG. 6C, the application of "timer" is started. According to the table shown in FIG. 3, "5 hrs. (determination pattern 1)", "5 min. (determination pattern 2)", and "5 sec. (determination pattern 3)" can be selected as the unit for the input value "5" and therefore it is necessary to select one of those units so that "5" is processed as the input value of "timer". As a method of determining the unit to be actually used, "hour", "minute", and "second" may be displayed as choices on the display unit 108 as shown in FIG. 6D so that the user can select the unit, or a specific numeral and corresponding unit thereto may be set beforehand so that the set unit is always applied to the input value. An example of setting beforehand the numeral and the unit corresponding thereto is later described. In the case where "minute" is selected as the unit of the numeral "5", for example, a timer that is set to 5 minutes is started, and an alarm is output from the speaker 105 of the mobile phone unit 100 after 5 minutes has elapsed.

In the case where the numeric string input with the operation unit 107 is "1*30", for example, and "timer" is selected as the application, and subsequently "time period" is selected as the unit of "1*30", the timer of 1 hour 30 min. is started. In the case where "minute" is selected as the unit, the timer set to 1 min. 30 sec. is started.

Figure 7A:
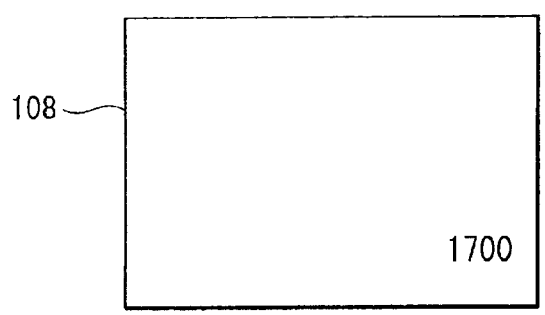
FIGS. 7A to 7E are explanatory diagrams showing display examples of a mobile phone unit according to an embodiment of the present invention.
Figure 7B:
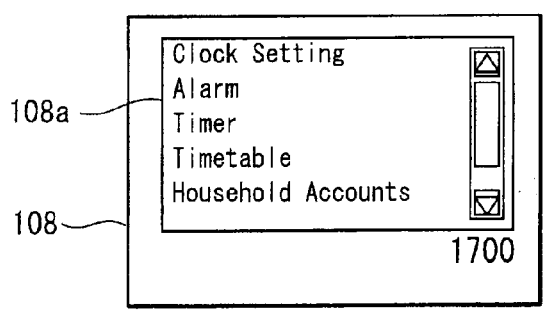

FIGS. 7A to 7E are diagrams showing a display example for the start of "timetable" from the input of numerals at the operation unit 107. For example, as shown in FIG. 7A, when depressing the option key 107c of the mobile phone unit 100 in a state of the numerals "1700" input with the operation unit 107 being displayed on the display unit 108, the submenu 108a shown in FIG. 7B is displayed. The applications displayed on the submenu 108a are determined through the processing steps S13, S15, S16 and S17 described in the flow chart shown in FIG. 5, similarly to the case in FIGS. 6A to 6D.

The input value is "1700" which is determined to correspond to "input pattern 6" in the table shown in FIG. 3 (step S13), and therefore determination patterns 3, 4, 6 and 9 are retrieved as the determination patterns corresponding to the input pattern 6 (step S15). Further, as the applications corresponding to respective determination patterns, "clock setting", "alarm", "timer", "timetable", "household accounts", "Internet easy access" and "calculator" are retrieved from the correspondence table shown in FIG. 4 (step S16). More specifically, a list of the applications that are "clock setting", "alarm", "timer", "timetable", "household accounts", "Internet easy access" and "calculator" is displayed on the display unit 108 as the submenu in the case where the input value is "1700".

Figure 7C:
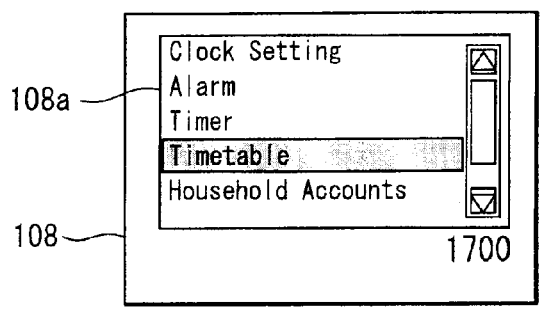

In the case where "timetable" is selected from the list of displayed applications as shown in FIG. 7C, the application of "timetable" is started. The unit can be selected and determined for the input value "1700" based on the following procedure. First, it is determined that "1700" is "input pattern 6" in the table of FIG. 3, and then determination patterns 3, 4, 6 and 9 are retrieved as those corresponding to "input pattern 6". Subsequently, those determination patterns are applied to the table shown in FIG. 4, where only "determination pattern 6" is matched with the determination pattern corresponding to "timetable" in FIG. 4. More specifically, "17:00" that is the form of "determination pattern 6 (hour/minute(/second)" can be selected as the unit of "1700" for the "timetable". "17:00"

is handled as the input value in "timetable", and as a result, the timetable around 17:00 is displayed.

Figure 7D:
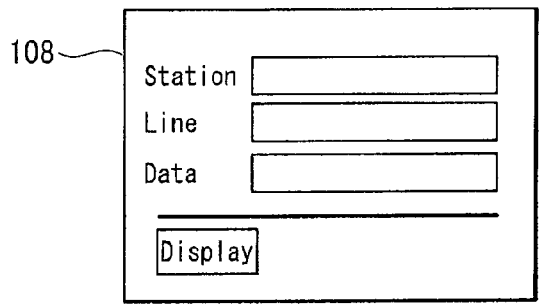
Figure 7E:
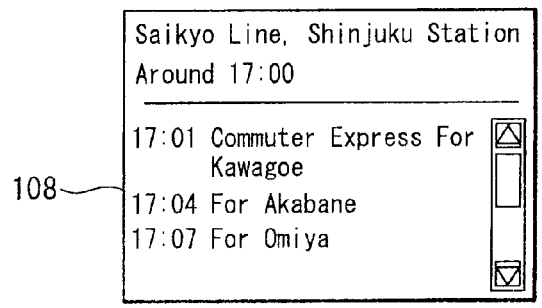

Information about a station, a line, a date and the like which are values set for the application may be input by the user using the operation unit 107 after displaying an input form on the display unit 108 as shown in FIG. 7D, but the used stations, lines and the like may be registered in advance. FIG. 7E shows a display example of the timetable in the case where "Shinjuku" is selected as the station and "Saikyo Line" is selected as the line. Since the numerals "1700" input with the operation unit 107 are recognized as "17:00" in the application of "timetable" and processed as the input value (retrieving condition in this case), the timetable around 17:00 is displayed.

Figure 8A:
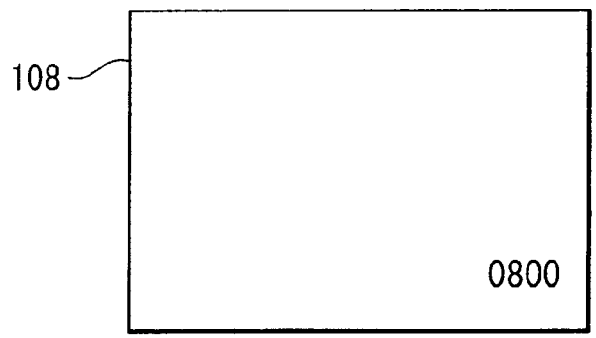
FIGS. 8A to 8D are explanatory diagrams showing display examples of a mobile phone unit according to an embodiment of the present invention.
Figure 8B:
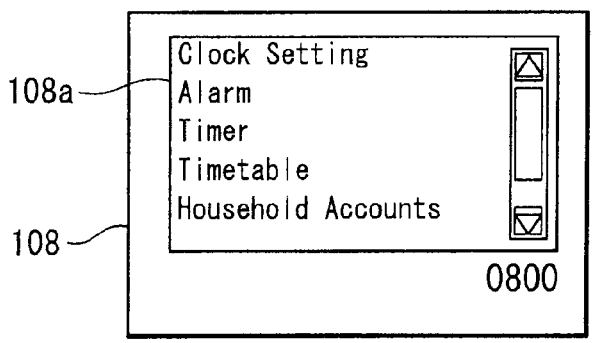

FIGS. 8A to 8D are diagrams showing a display example for the start of "alarm" from the input of numerals at the operation unit 107. For example, as shown in FIG. 8A, when depressing the option key 107c of the mobile phone unit 100 in a state of the numerals "0800" input with the operation unit 107 being displayed on the display unit 108, the submenu 108a shown in FIG. 8B is displayed. The applications displayed on the submenu 108a are determined through the processing steps S13, S15, S16 and S17 in the flow chart shown in FIG. 5, similarly to the cases shown in FIGS. 6 and 7.

The input value is "0800" which is determined to correspond to "input pattern 6" in the table shown in FIG. 3 (step S13), and therefore determination patterns 3, 4, 6 and 9 are retrieved as those corresponding to the input pattern 6 (step S15). Further, as the applications corresponding to respective determination patterns, "clock setting", "alarm", "timer", "timetable", "household accounts", "Internet easy access" and "calculator" are retrieved from the correspondence table shown in FIG. 4 (step S16). More specifically, a list of the applications that are "clock setting", "alarm", "timer", "timetable", "household accounts", "Internet easy access" and "calculator" is displayed on the display unit 108 as the submenu in the case where the input value is "0800".

Figure 8C:
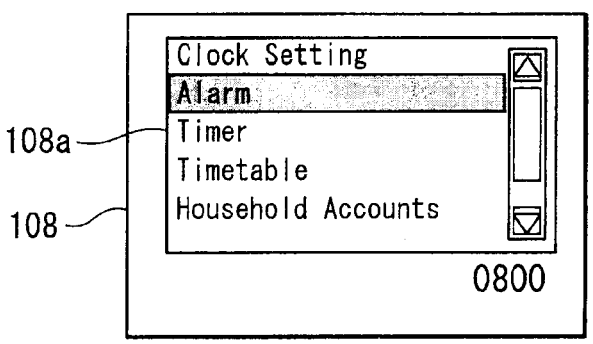
Figure 8D:
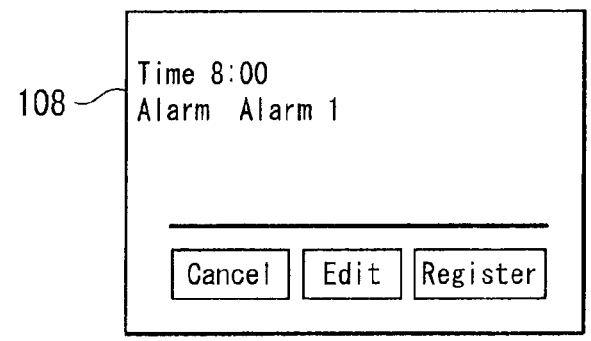

In the case where "alarm" is selected from the list of displayed applications as shown in FIG. 8C, the application of "alarm" is started. Since "8:00 (determination pattern 4)" can be selected for the input value of "0800" according to the tables shown in FIGS. 3 and 4, "0800" is recognized as "8:00" and set as the start time of the alarm as shown in FIG. 8D.

With the configuration as heretofore described, the desired application can be started only by inputting numerals using the numeric keys, and therefore there is no need for the user to memorize the structure and hierarchy of the menus.

Further, according to the embodiment, the input numeric string is directly processed as the input value for the application, and therefore the procedure is simplified and user's convenience is improved in comparison to that of related art in which the application to be used is searched from a menu and the numeric value is input after selecting the application.

It should be noted that "clock setting", "alarm", "timer", "timetable", "calendar", "household accounts", "Internet access" and "calculator" are set as the applications that handle a numeric string as the input value in the above-described embodiment, but an embodiment of the present invention may be applied to other applications as long as the applications use a numeric value as a variable.

In addition, according to the above-described embodiment, the units selected in the case where the numeric value input with the operation unit 107 is processed as the input value of the application are displayed as the choices on the display unit 108 so that the user can select the unit. However, specific numerals may be associated with specific units to be set in advance. Examples of setting screens in this case are described by referring to FIGS. 9 through 12.

Figure 9A:
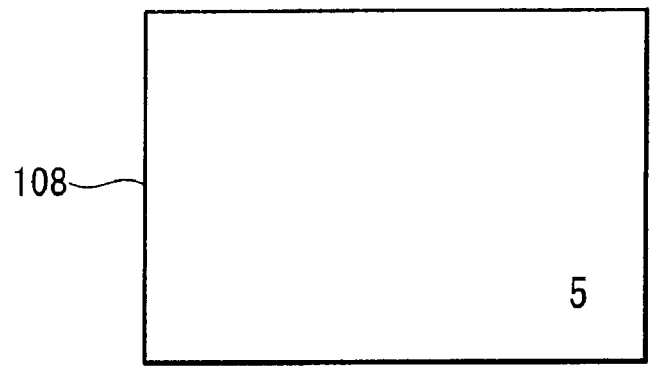
FIGS. 9A to 9C are explanatory diagrams showing display examples of a mobile phone unit according to an embodiment of the present invention.
Figure 9B:
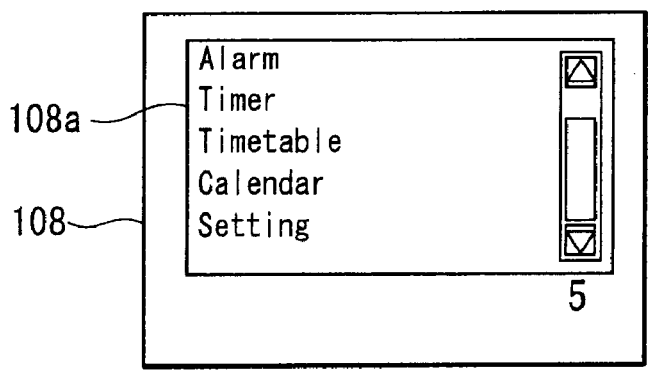
Figure 9C:
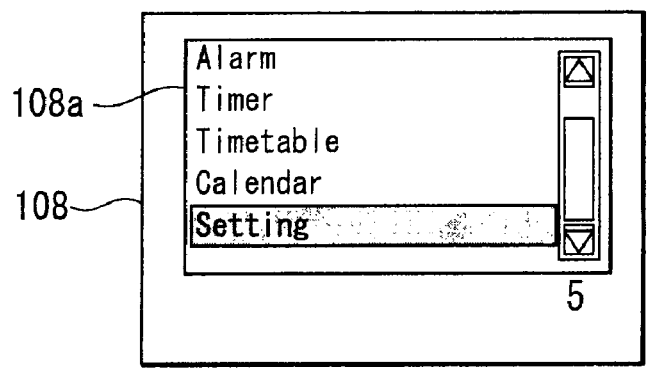
Figure 10A:
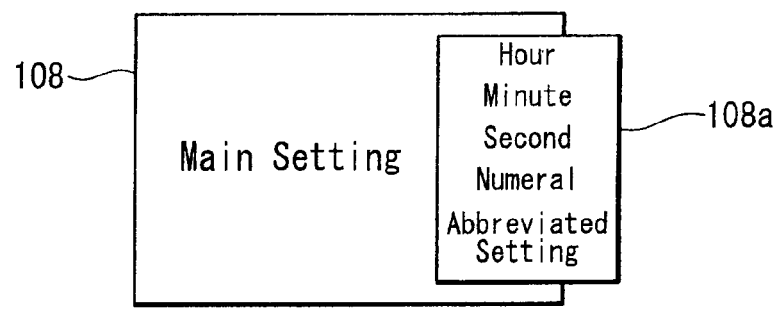
FIGS. 10A to 10C are explanatory diagrams showing display examples of a mobile phone unit according to an embodiment of the present invention.

FIGS. 9A to 9C are diagrams showing a display example in the case of the numeral "5" being associated with the unit of "minute", for example. As shown in FIG. 9A, an arbitrary numeral is input with the operation unit 107 and "5" is displayed on the display unit 108. Subsequently the option key 107c is depressed in that state, and "setting" is also displayed in the list of applications as shown in FIG. 9B. Then, the setting screen shown in FIG. 10A is displayed in the case where "setting" is selected using the operation unit 107.

Figure 10B:
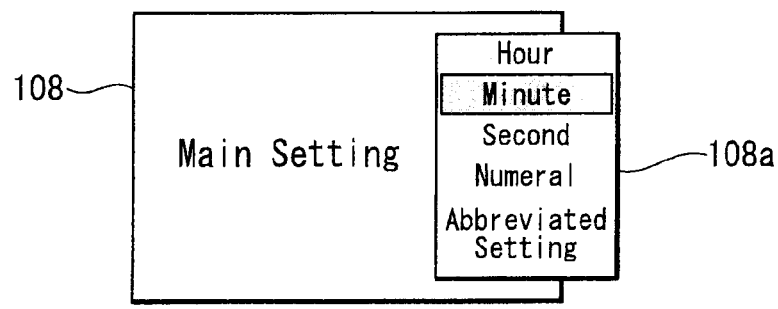
Figure 10C:
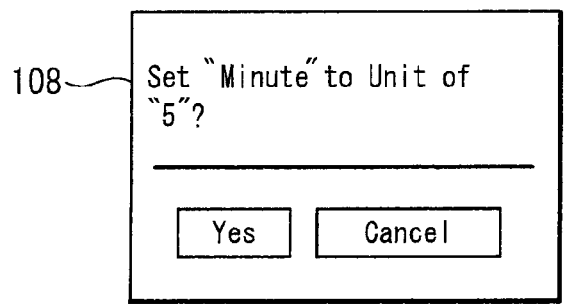

Items such as "hour", "minute", "second", "numeral" and "abbreviated setting", for example, are displayed on the setting screen, and the numerals of three digits or less are set to "hour", "minute" and "second". In the case where "minute" is selected as shown in FIG. 10B, "minute" is associated with the input numeral "5" as the unit. In this case, a confirmation message shown in FIG. 10C may be displayed.

Figure 11A:
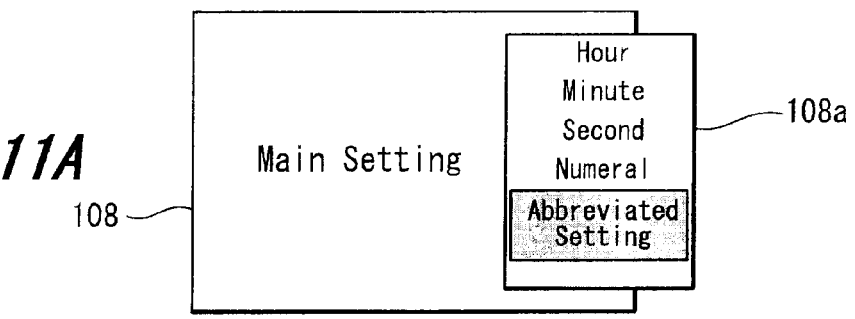
FIGS. 11A to 11D are explanatory diagrams showing display examples of a mobile phone unit according to an embodiment of the present invention.
Figure 11B:
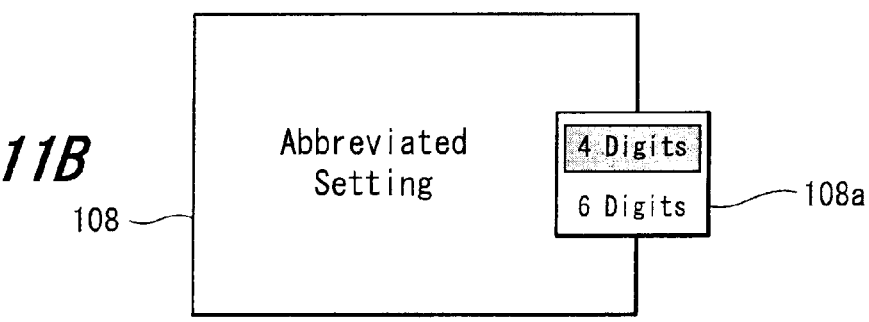
Figure 11C:
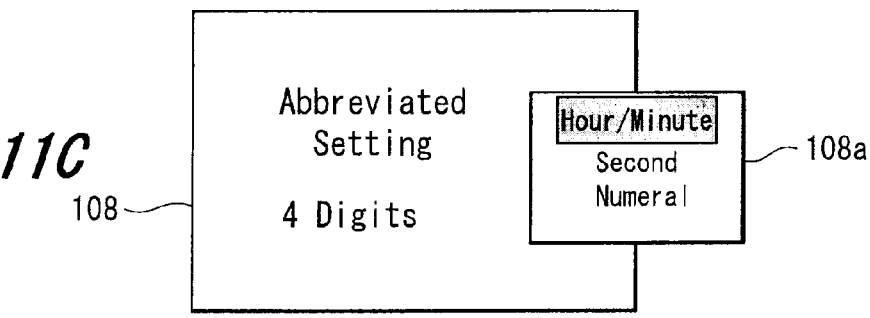
Figure 11D:
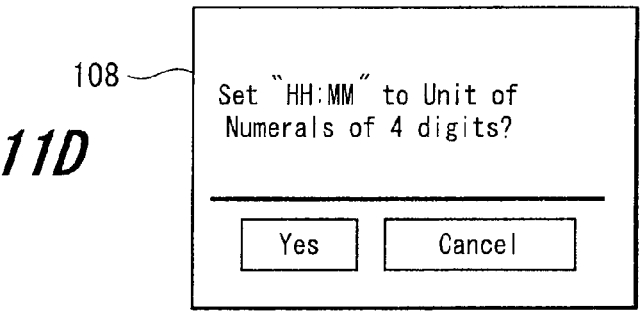

"Abbreviated setting" includes two kinds of setting that are "four digits" and "six digits", for example. In the case where the numerals input with the operation unit 107 are four digits or six digits, the input numerals can be associated with the specific units. FIGS. 11A to 11D are diagrams showing an example of "four-digit abbreviated setting". As shown in FIG. 11A, when selecting "abbreviated setting" using the operation unit 107, the submenu 108a showing "4 digits" and "6 digits" is displayed as shown in FIG. 11B. In the case where "4 digits" is selected, the submenu 108a showing "hour/minute", "second" and "numeral" is further displayed as shown in FIG. 11C. The four-digit numerals are set as "HH:MM (hour: minute)" for "hour/minute", set as "SSSS" for "second", and set as "NNNN" for "numeral". In the case where "hour/minute" is selected and set as shown in FIG. 1C, for example, and the number of digits of the numerals input using the operation unit 107 is four, the input numerals are recognized as "HH:MM" in the application. The confirmation message shown in FIG. 11D may be displayed in this case.

In the above-described embodiment, a mobile phone unit is employed as a wireless communication terminal, but an embodiment of the present invention can be applied to other communication terminals as long as the terminals are portable devices having numeric keys and including the communication function, and may be applied to an information communication terminal having no telephone function or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication terminal that performs wireless communication with a predetermined base station, comprising:

a storage unit configured to store information indicating correspondence between applications handling a numeric string and numeric string formats and units, the numeric string including at least one numeral as an input value;

an operation unit configured to input the numeric string;

a control unit configured to determine whether a format of the numeric string corresponds to any of the stored numeric string formats, and to retrieve a corresponding application based on the stored information indicating correspondence between the application retrieved and the format and unit of the numeric string, when the numeric string corresponds to a stored numeric string format;

a display unit configured to display a list of names of corresponding applications retrieved by the control unit; and a network unit configured to connect to a network when the application requires the network to retrieve information relating to the numeric string.

2. A wireless communication terminal according to claim 1, wherein the numeric string further includes at least one symbol in combination with the at least one numeral.

3. A wireless communication terminal according to claim 1, wherein the numeric string is processed as an input value to the application.

4. The wireless communication terminal according to claim 1, wherein an error message is displayed when the numeric string does not correspond to any stored numeric string format.

5. A method of displaying an application comprising:

storing, at a storage unit, information indicating correspondence between applications handling a numeric string and numeric string formats and units, the numeric string including at least one numeral as an input value;

inputting, at an operation unit, the numeric string;

determining, at a control unit, whether a format of the numeric string corresponds to any of the stored numeric string formats;

retrieving, at a control unit, a corresponding application based on the stored information indicating the correspondence between the application retrieved and the format and unit of the numeric string, when the numeric string corresponds to a stored numeric string format;

displaying, at a display unit, a list of names of corresponding applications retrieved by the control unit; and connecting, at a network unit, to a network when the application requires the network to retrieve information relating to the numeric string.

6. A non-transitory computer-readable medium storing computer-readable instructions thereon for a wireless communication terminal capable of inputting a numeral and performing display processing, the computer-readable instructions when executed by the wireless communication terminal cause the wireless communication terminal to perform a method comprising:

storing information indicating correspondence between applications handling a numeric string and numeric string formats and units, the numeric string including at least one numeral as an input value;

inputting the numeric string;

determining whether a format of the numeric string corresponds to any of the stored numeric string formats;

retrieving a corresponding application based on the stored information indicating the correspondence between the application retrieved and the format and unit of the numeric string, when the numeric string corresponds to a stored numeric string format;

displaying a list of names of retrieved corresponding applications; and connecting to a network when the application requires the network to retrieve information relating to the numeric string.

* * * * *